US011277436B1

(12) United States Patent
Smith et al.

(10) Patent No.: US 11,277,436 B1
(45) Date of Patent: Mar. 15, 2022

(54) IDENTIFYING AND MITIGATING HARM FROM MALICIOUS NETWORK CONNECTIONS BY A CONTAINER

(71) Applicant: CA, Inc., San Jose, CA (US)

(72) Inventors: Spencer Dale Smith, El Segundo, CA (US); Frank X. Barajas, Redondo Beach, CA (US); Paul D. Hernandez, Redondo Beach, CA (US)

(73) Assignee: CA, INC., New York, NY (US)

(*) Notice: Subject to any disclaimer, the term of this patent is extended or adjusted under 35 U.S.C. 154(b) by 251 days.

(21) Appl. No.: 16/450,652

(22) Filed: Jun. 24, 2019

(51) Int. Cl.
*H04L 29/06* (2006.01)

(52) U.S. Cl.
CPC ...... *H04L 63/1441* (2013.01); *H04L 63/1416* (2013.01)

(58) Field of Classification Search
CPC .................. H04L 63/1441; H04L 63/1416
USPC ........................................................ 726/23
See application file for complete search history.

(56) References Cited

U.S. PATENT DOCUMENTS

| | | | | |
|---|---|---|---|---|
| 9,444,839 B1* | 9/2016 | Faulkner | ............... | H04L 67/146 |
| 9,917,855 B1* | 3/2018 | Li | ........................ | G06F 21/566 |
| 10,210,329 B1* | 2/2019 | Malik | ..................... | G06F 21/53 |
| 10,454,793 B2* | 10/2019 | Deen | ....................... | H04L 45/38 |
| 2009/0254990 A1* | 10/2009 | McGee | ............... | H04L 63/0227 |
| | | | | 726/22 |
| 2013/0125119 A1* | 5/2013 | Vipat | ..................... | G06F 21/53 |
| | | | | 718/1 |
| 2015/0007317 A1* | 1/2015 | Jain | ..................... | H04L 63/0227 |
| | | | | 726/23 |
| 2015/0013008 A1* | 1/2015 | Lukacs | ................. | G06F 21/566 |
| | | | | 726/24 |
| 2015/0026809 A1* | 1/2015 | Altman | ............... | H04L 63/1416 |
| | | | | 726/23 |
| 2016/0036837 A1* | 2/2016 | Jain | ..................... | H04L 63/1416 |
| | | | | 726/23 |
| 2016/0036838 A1* | 2/2016 | Jain | ..................... | H04L 63/1416 |
| | | | | 726/23 |
| 2016/0127395 A1* | 5/2016 | Underwood | ........ | H04L 63/1425 |
| | | | | 726/23 |
| 2016/0197940 A1* | 7/2016 | Jung | ....................... | H04L 63/18 |
| | | | | 726/24 |
| 2016/0335110 A1* | 11/2016 | Paithane | ................. | G06F 21/53 |
| 2016/0359879 A1* | 12/2016 | Deen | ..................... | G06F 16/173 |
| 2016/0359890 A1* | 12/2016 | Deen | ................... | G06F 16/1748 |
| 2017/0039371 A1* | 2/2017 | Lukacs | ................. | G06F 3/0653 |

(Continued)

*Primary Examiner* — Badrinarayanan
(74) *Attorney, Agent, or Firm* — Adsero IP (57) ABSTRACT

Identifying and mitigating harm from malicious network connections by a container. In some embodiments, a method may include receiving, from a shim, notifications of all network connections that a container has sought to establish through the shim. The method may also include monitoring all actual network connections established by the container. The method may further include comparing the notifications to the actual network connections to determine whether any actual network connection established by the container bypassed the shim. The method may also include, in response to determining that any actual network connection established by the container bypassed the shim, identifying the network connection established by the container that bypassed the shim as a malicious network connection, and performing a security action to mitigate harm from the malicious network connection.

17 Claims, 4 Drawing Sheets

(56) References Cited

U.S. PATENT DOCUMENTS

| | | |
|---|---|---|
| 2017/0111392 A1* | 4/2017 | Lee ........................ H04L 63/102 |
| 2017/0126727 A1* | 5/2017 | Beam ................... H04L 63/1433 |
| 2017/0208092 A1* | 7/2017 | Ochse .................. H04L 63/0209 |
| 2018/0004948 A1* | 1/2018 | Martin ................... G06F 21/552 |
| 2018/0020002 A1* | 1/2018 | Duca ..................... G06F 21/572 |
| 2020/0036750 A1* | 1/2020 | Bahnsen ............. H04L 63/1416 |

* cited by examiner

IDENTIFYING AND MITIGATING HARM FROM MALICIOUS NETWORK CONNECTIONS BY A CONTAINER

BACKGROUND

A container may be a standard unit of software that is configured to package up code and all its dependencies so that applications may run quickly and reliably from one computing environment to another. A container may be a lightweight, standalone, executable package of software that includes everything needed to run an application, such as code, runtime, system tools, system libraries and settings. One potential advantage of running an application in a container is that the application may run the same regardless of the infrastructure, because the container may isolate the application from its environment and ensure that it works uniformly despite differences in infrastructure. In general, an application running inside a container may only be aware of the container's contents and devices assigned to the container. Containers are becoming increasingly used in a variety of settings, such as in various points in a supply chain.

Unfortunately, with the increased use of containers, malicious actors have increased their attempts to attack and infiltrate containers. For example, malicious actors may attempt to insert a malicious library, malicious application, or other malicious code into a container in an attempt to create malicious network connections between the container and another device. These malicious network connections may then be employed by the malicious actor to steal sensitive information from the container or to grant access to the container to an unauthorized device.

For example, in a supply chain attack, a malicious actor may attempt to gain access to one or more containers in a supply chain. Containers may be prime targets for supply chain attacks because containers often make heavy use of third-party libraries and are often temporary, running only long enough to accomplish a specific task. When a malicious actor gains access to a container in a supply chain attack, the malicious actor may inflict substantial damage on the supply chain. Unfortunately, however, identifying and mitigating harm from such attacks can be difficult due to malicious actors becoming increasingly adept at disguising malicious network connections from a container as legitimate network connections.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying and mitigating harm from malicious network connections by a container may be performed, at least in part, by a computing device including one or more processors. The method may include receiving, from a shim, notifications of all network connections that a container has sought to establish through the shim. The method may also include monitoring all actual network connections established by the container. The method may further include comparing the notifications to the actual network connections to determine whether any actual network connection established by the container bypassed the shim. The method may also include, in response to determining that any actual network connection established by the container bypassed the shim, identifying the network connection established by the container that bypassed the shim as a malicious network connection, and performing a security action to mitigate harm from the malicious network connection.

In some embodiments, the performing of the security action to mitigate harm from the malicious network connection may include one or more of blocking the malicious network connection, rerouting the malicious network connection, or throttling the malicious network connection.

In some embodiments, the performing of the security action to mitigate harm from the malicious network connection may include one or more of blocking the container, quarantining the container, or terminating execution of the container.

In some embodiments, the performing of the security action to mitigate harm from the malicious network connection may include generating an alert.

In some embodiments, the shim may include a shim library, and the receiving, from the shim library, of the notifications may include receiving the notifications from the shim library due to a function from the shim library being called from within the container.

In some embodiments, the monitoring of all actual network connections established by the container may include monitoring net flow logs of all actual network connections established by the container.

In some embodiments, the malicious network connection may have originated from a malicious third-party library that was injected into the container.

In some embodiments, each notification of each network connection may include an IP address of another device with which the container seeks to communicate over the network connection.

In some embodiments, the method may further include determining a unique identifier that is associated with a container. In these embodiments, the determining of the unique identifier that is associated with the container may include receiving the unique identifier over a secure channel prior to the container establishing any network connections. In these embodiments, each notification may either include the unique identifier or not include the unique identifier. In these embodiments, the comparing may include determining whether any notification failed to include the unique identifier, and the identifying and performing may alternatively be in response to determining that any notification failed to include the unique identifier.

Also, in some embodiments, one or more non-transitory computer-readable media may include one or more computer-readable instructions that, when executed by one or more processors, cause the one or more processors to perform a method for identifying and mitigating harm from malicious network connections by a container.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

As containers are becoming increasingly used in a variety of settings, such as in various points in a supply chain, malicious actors have increased their attempts to attack and infiltrate containers. For example, malicious actors may attempt to insert a malicious library, malicious application, or other malicious code into a container in an attempt to create malicious network connections between the container and another device. These malicious network connections may then be employed by the malicious actor to steal sensitive information from the container or to grant access to the container to an unauthorized device.

For example, in a supply chain attack, a malicious actor may attempt to gain access to one or more containers in a supply chain and, in doing so, may inflict substantial damage on the supply chain. Unfortunately, however, identifying and mitigating harm from such attacks can be difficult due to malicious actors becoming increasingly adept at disguising malicious network connections from a container as legitimate network connections.

Some embodiments disclosed herein may enable identifying and mitigating harm from malicious network connections by a container. In particular, some embodiments may include a security application that employs a shim in connection with a container. As used herein, the term "shim" refers to a module or library capable of receiving and sending API calls, as well as sending notifications of received API calls. In some embodiments, a shim employed in connection with a container may be contained within the container. The security application may receive, from a shim, notifications of all network connections that a container has sought to establish through the shim. The security application may also monitor all actual network connections established by the container. The security application may then compare the notifications to the actual network connections to determine whether any actual network connection established by the container bypassed the shim. If any actual network connection established by the container did bypass the shim, the security application may identify the network connection as a malicious network connection, and may perform a security action to mitigate harm from the malicious network connection. In this manner, malicious network connections established by a container may be identified and harm from any such malicious network connections may be mitigated.

Some embodiments enable a security application to effectively attempt to match the expected behavior of a container with the actual behavior of the container. The security application may determine the expected behavior of the container by allowing developers of legitimate containers and/or container-executable applications to direct network traffic through an authorized shim. The security application may then observe actual network traffic (e.g., either directly or by monitoring net flow logs), and any traffic generated by the container that the shim did not observe may be considered as potentially malicious and a sign of tampering with the container.

For example, in a supply chain attack where a malicious actor gains access to a container in a supply chain by inserting a malicious library, malicious application, or other malicious code into the container, and then attempts to create malicious network connections between the container and another device, some embodiments disclosed herein may be employed to identify and mitigate harm from any such malicious network connections. In so doing, some embodiments disclosed herein may prevent the malicious actor in the supply chain attack from stealing sensitive information from the container or from granting access to the container to an unauthorized device, and may thus prevent the malicious actor from inflicting substantial damage on the supply chain.

Figure 1:
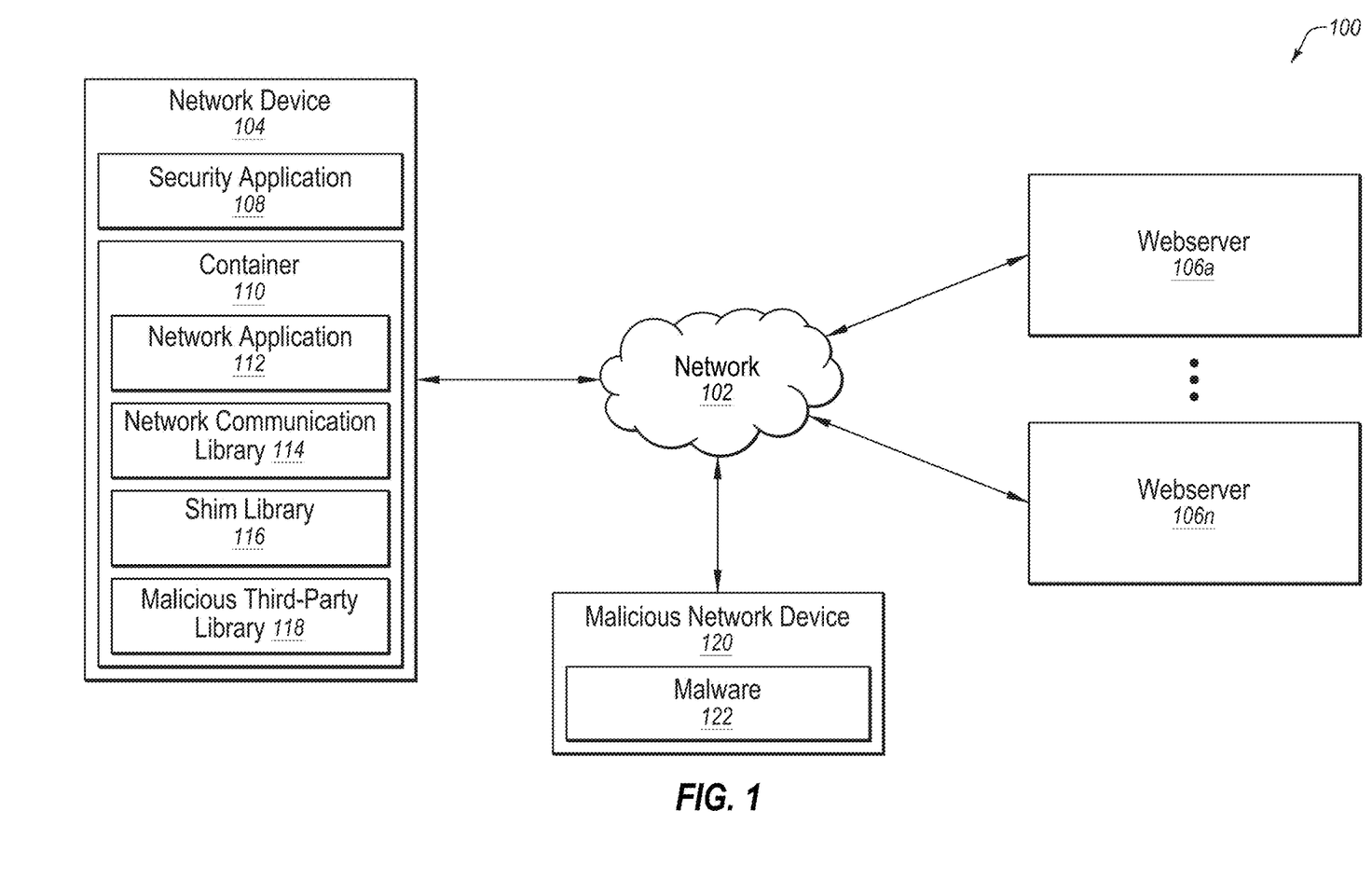
FIG. 1 illustrates an example system configured for identifying and mitigating harm from malicious network connections by a container.

Turning to the figures, FIG. 1 illustrates an example system 100 configured for identifying and mitigating harm from malicious network connections by a container. The system 100 may include a network 102, a network device 104, webservers 106a-106n, and a malicious network device 120.

In some embodiments, the network 102 may be configured to communicatively couple the network device 104, the webservers 106a-106n, and the malicious network device 120, to one another and to other devices. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
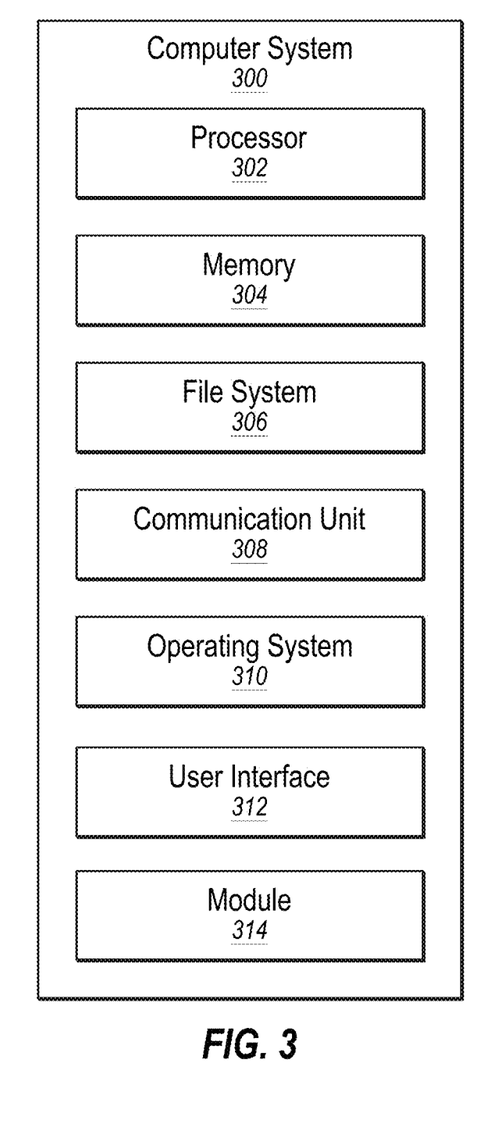
FIG. 3 illustrates an example computer system that may be employed in identifying and mitigating harm from malicious network connections by a container.

In some embodiments, the webservers 106a-106n may each be any computer system capable of communicating over the network 102 and capable of hosting webpages or other web content addressable at a particular web domain or IP address, examples of which are disclosed herein in connection with the computer system 300 of FIG. 3.

In some embodiments, the malicious network device 120 may be any computer system capable of communicating over the network 102 and capable of storing and/or executing a malware 122. The malware 122 may include malicious functionality typical of any type of malware including, but not limited to, a spyware, a virus, a worm, a logic bomb, a trapdoor, a Trojan horse, a Remote Admin Trojan (RAT), a mobile malicious code, a malicious font, or a rootkit, or some combination thereof.

In some embodiments, the network device 104 may be any computer system capable of communicating over the network 102 and executing a container, examples of which are disclosed herein in connection with the computer system 300 of FIG. 3. The network device 104 may include a security application 108 and a container 110. The security application 108 may be configured to identify and mitigate harm from malicious network connections by the container 110, as disclosed in greater detail in connection with FIG. 2. In some embodiments, the security application 108 may include, or be part of, a network security application, such as any of Symantec's Cloud Workload Protection Suite applications.

The container 110 may include a network application 112, a network communication library 114, a shim library 116, and a malicious third-party library 118.

In some embodiments, the network application 112 may be an application that is configured to establish a network connection with another device over the network 102, such as any of the webservers 106a-106n. The network application 112 may employ the network communication library 114 to establish these network connections. The network communication library 114 may be any network communication library that may be employed to establish network connections between two devices. Example communication libraries include, but are not limited to, curl, libcurl, POCO (the networking functionality), Boost.asio, Python socket library, and Python Requests library. In some embodiments, the malicious third-party library 118 may also be employed to establish these network connections, and may be similar to and/or mimic the functionality of the network communication library 114. However, the malicious third-party library 118 may have been maliciously injected into the container 110 (that is running on the network device 104) by the malware 122 (running on the malicious network device 120), possibly without the knowledge and/or permission of an authorized user of the network device 104.

In some embodiments, instead of making calls directly to the network communication library 114 and/or to the malicious third-party library 118 in order to establish a network connection with another device, the network application 112 may be programmed to instead make calls to the shim library 116. The shim library 116 may be configured to function similarly to the network communication library 114, but to do so while in communication with the security application 108 in order to assist the security application 108 in identifying and mitigating harm from malicious network connections by the container 110. For example, the shim library 116 may include similar functionality (e.g., similar API calls) as the network communication library 114. In some embodiments, the shim library 116 may be developed by the same entity that develops the security application 108 (e.g., Symantec Corporation). In some embodiments, the shim library 116 may be developed by an entity other than the entity that develops the security application 108. For example, tools may be provided to developers to enable them to create their own shims if they are using a network communication library from which shims have not yet been created. This may include providing developers with an explicit API that they could call that does the same thing that the shim would do.

When each API call is made to the shim library 116, not only may the shim library 116 pass the API call along to the corresponding API call in the network communication library 114, but the shim library 116 may additionally send a notification of the API call and/or any corresponding network connection sought to be established as a result of the API call to the security application 108.

The security application 108 may then keep track of all such notifications, as well as keeping track of all actual network connections established by the container 110. In embodiments where the shim library 116 is the only legitimate conduit for valid API calls that establish network connections, any actual network connections that are monitored by the security application 108 that do not match up with a corresponding notification from the shim library 116 may be determined to be malicious network connections, because they can be determined to have been established through an illegitimate API call directly to the network communication library 114 and/or to the malicious third-party library 118 and/or by an illegitimate API call to the shim library 116 without a unique identifier, instead of being established through a legitimate API call to the shim library 116. The security application 108 may then perform a security action to mitigate harm from any malicious network connection, such as blocking the malicious network connection, rerouting the malicious network connection, throttling the malicious network connection, blocking the container 110, quarantining the container 110, or terminating execution of the container 110 on the network device 104. In some embodiments, the security action may include generating an alert that may be sent, for example, to an administrator of the container 110, the network device 104, and/or the network 102. This alert may give the administrator visibility into the detected malicious network connection to enable the administrator to decide how to best deal with the malicious network connection.

For example, in a supply chain attack where a malicious actor operating the malicious network device 120 gains access to the container 110 in a supply chain by inserting the malicious third-party library 118 into the container 110, and then attempts to create malicious network connections between the container 110 and another device (such as the malicious network device 120 or one of the webservers 106a-106n), the security application 108 may be employed to identify and mitigate harm from any such malicious network connections. In so doing, the security application 108 may prevent the malicious actor in the supply chain attack from stealing sensitive information from the container 110 or from granting access to the container 110 to an unauthorized device, and may thus prevent the malicious actor from inflicting substantial damage on the supply chain.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. For example, the system 100 may include multiple network devices with multiple containers. Further, multiple containers may be stored and/or executed on a single network device. Further, in some embodiments, the security application 108 may be stored and/or executed on a device other than the network device 104, or across multiple network devices.

Figure 2A:
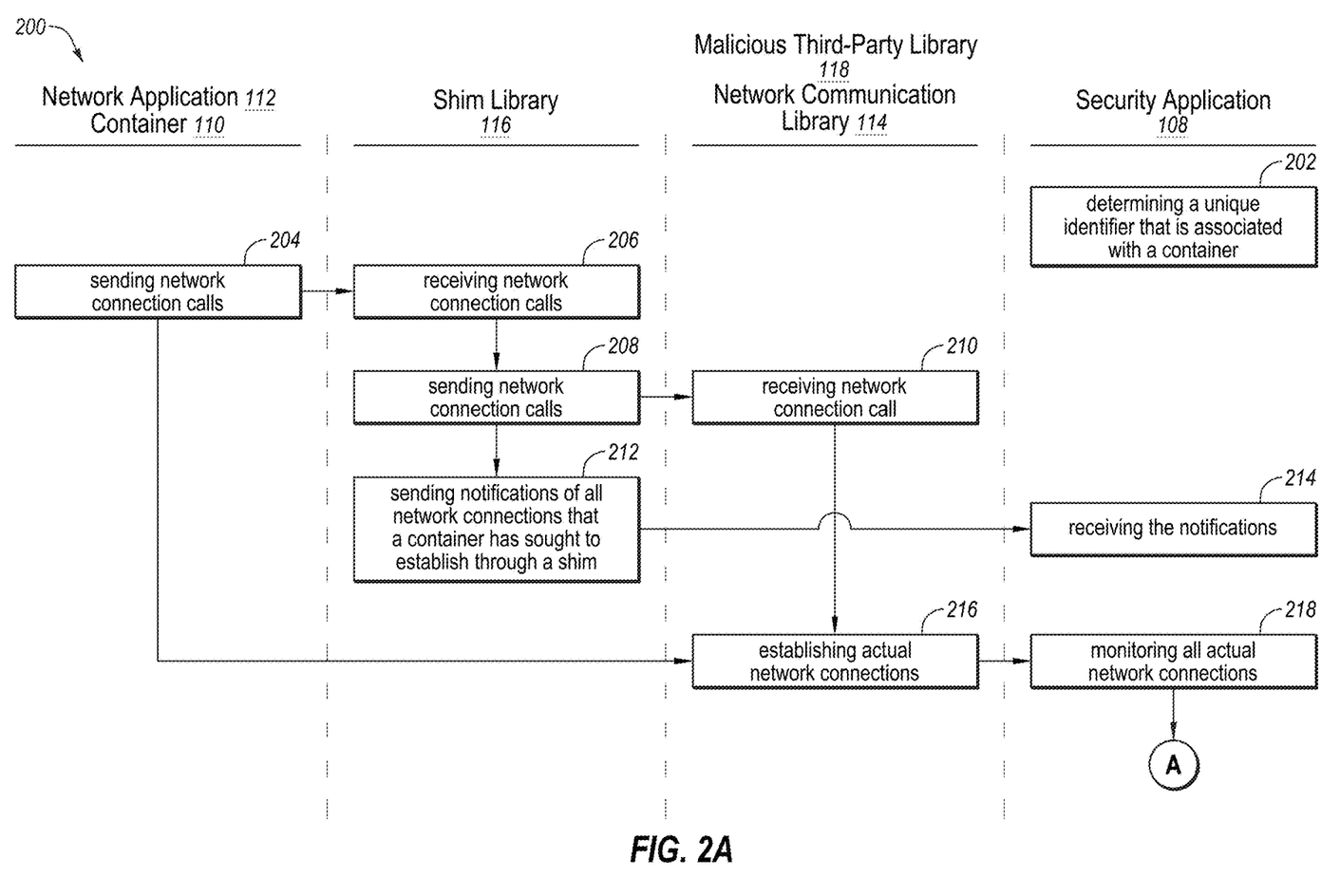
FIGS. 2A-2B are a flowchart of an example method for identifying and mitigating harm from malicious network connections by a container.
Figure 2B:
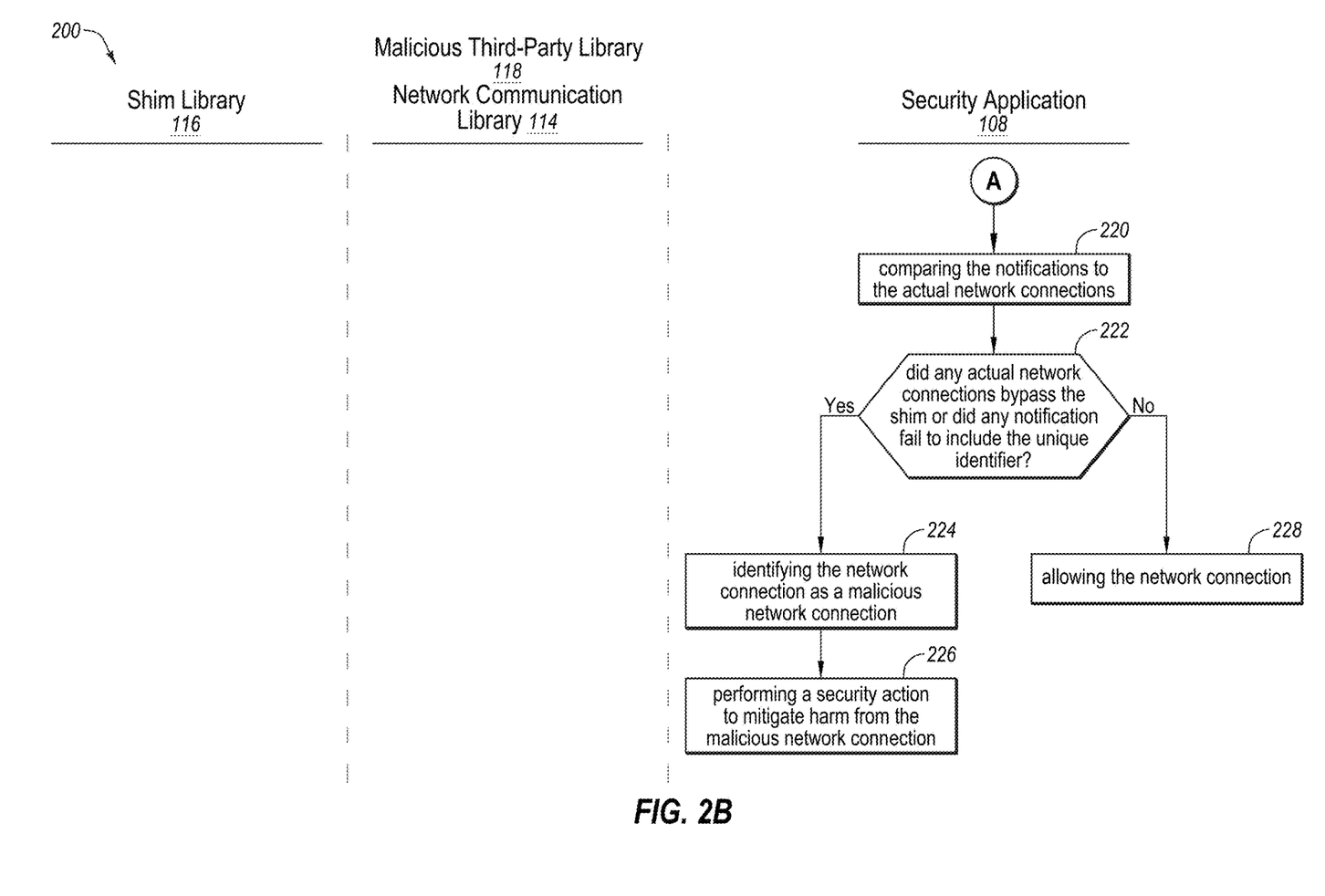

FIGS. 2A-2B are a flowchart of an example method 200 for identifying and mitigating harm from malicious network connections by a container. The method 200 may be performed, in some embodiments, by a device or system, such as by the security application 108 and/or the shim library 116 executing on the network device 104 of FIG. 1. In these and other embodiments, the method 200 may be performed by one or more processors based on one or more computer-readable instructions stored on one or more non-transitory computer-readable media. The method 200 will now be described in connection with FIGS. 1 and 2A-2B.

The method 200 may include, at action 202, determining a unique identifier that is associated with a container. In some embodiments, the determining of the unique identifier that is associated with the container may include receiving the unique identifier over a secure channel prior to the container establishing any network connections. For example, the security application 108 may determine, at action 202, a unique identifier that is associated with the container 110. The unique identifier may be fixed or may be variable, and may be employed by the security application 108, for example, to monitor and protect multiple containers simultaneously by giving each container its own unique identifier. The unique identifier may be a secret unique identifier that may be known to legitimate users of the container 110, but may not be known to malicious actors who attempt to illegitimately access the container 110. To maintain the secrecy of this unique identifier, the unique identifier may be received over a secure (e.g., encrypted, password protected, etc.) channel prior to the container 110 establishing any network connections.

The method 200 may include, at action 204, sending network connection calls. For example, the container 110 may send, at action 204, network connection calls. In some embodiments, these network connection calls may be sent by the network application 112 that is executing within the container 110. Where these network connection calls are legitimate, they may be sent via the shim library 116 and may include the unique identifier of the container 110. However, where these network connection calls are illegitimate, they may be sent directly to the network communication library 114 and/or to the malicious third-party library 118, or may be sent to the shim library 116 but may not include the unique identifier of the container 110.

The method 200 may include, at action 206, receiving network connection calls, at action 208, sending network connection calls, at action 210, receiving network connection calls, at action 212, sending notifications of all network connections that a container has sought to establish through a shim and, at action 214, receiving the notifications. In some embodiments, the shim may include a shim library, and the receiving, from the shim library, of the notifications may include receiving the notifications from the shim library due to a function from the shim library being called from within the container. In some embodiments, each notification of each network connection may include an IP address of another device with which the container seeks to communicate over the network connection. For example, where the network connection calls are legitimate, they may be sent, at action 204, by the network application 112 from within the container 110 and received, at action 206, at the shim library 116. The shim library 116 may then send, at action 208, and the network communication library 114 may receive, at action 210, the network connection calls. Simultaneously with, just prior to, or just after the action 208, the shim library 116 may send, at action 212, and the security application 108 may receive, at action 214, notifications of all network connections that a container has sought to establish through a shim, which may include an IP address of another device with which the container 110 seeks to communicate over the network connection, such as one of the webservers 106a-106n.

The method 200 may include, at action 216, establishing actual network connections. For example, whether the network connection calls are legitimate and sent via the shim library 116 with a unique identifier of the container 110, or are illegitimate and sent directly to the network communication library 114 and/or to the malicious third-party library 118 or sent to the shim library 116 without the unique identifier, the network connection call may result in the network communication library 114 and/or to the malicious third-party library 118 establishing, at action 216, the network connections requested in the network connection calls that were sent at action 204.

The method 200 may include, at action 218, monitoring all actual network connections. In some embodiments, the monitoring of all actual network connections established by the container may include monitoring net flow logs of all actual network connections established by the container. For example, the security application 108 may monitor, at action 218, all actual network connections established by the container 110 that are between the container 110 and another device by, for example, by monitoring all actual network connections directly or by monitoring net flow logs of all actual network connections.

The method 200 may include, at action 220, comparing the notifications to the actual network connections. For example, for each actual network connection established between the container 110 and another device, the security application 108 may compare, at action 220, the actual network connection to a stored list of all notifications received to determine, for example, whether there is a matching notification.

The method 200 may include, at action 222, whether any actual network connections bypassed the shim or whether any notification failed to include the unique identifier. If so (yes at action 222), the method 200 proceed to action 224 and if not (no at action 222), the method 200 may proceed to action 228. In some embodiments, each notification may either include the unique identifier or not include the unique identifier. For example, the security application 108 may determine, at action 222, whether any actual network connection bypassed the shim. This determination may include determining whether any actual network connection does not have a corresponding notification from the shim library 116. If there is no corresponding notification, then the security application 108 may determine that the actual network connection bypassed the shim. However, if there is a corresponding notification, then the security application 108 may determine that the actual network connection did not bypass the shim. Further, the security application 108 may determine, at action 222, whether any notification failed to include the unique identifier. This determination may include determining whether a matching notification is nevertheless defective because it failed to include the unique identifier associated with the container 110. This determination regarding whether a notification includes the appropriate unique identifier may avoid a situation where a malicious actor attempts to call the shim library 116 so that notifications are sent to the security application 108 to trick the security application 108 into believing that illegitimate network connections are legitimate. In these situations, the malicious actor may not have access to the appropriate unique identifier, and thus may be unable to cause convincing notifications to be sent to the security application 108.

The method 200 may include, at action 224, identifying the network connection as a malicious network connection and, at action 226, performing a security action to mitigate harm from the malicious network connection. In some embodiments, the malicious network connection may have originated from a malicious third-party library that was injected into the container. In some embodiments, the performing of the security action to mitigate harm from the malicious network connection may include one or more of blocking the malicious network connection, rerouting the malicious network connection, or throttling the malicious network connection. In some embodiments, the performing of the security action to mitigate harm from the malicious network connection may include one or more of blocking the container, quarantining the container, or terminating execution of the container. In some embodiments, the security action may include generating an alert. For example, where the security application 108 determined, at action 222, that an actual network connection bypassed the shim or failed to include the unique identifier in the corresponding notification, the security application 108 may identify, at action 224, the actual network connection as a malicious network connection and the security application 108 may perform, at action 226, a security action to mitigate harm from the malicious network connection. The malicious network connection may have originated from the malicious third-party library 118 that was injected into the container 110. The security action may include, but is not limited to, blocking the malicious network connection, rerouting the malicious network connection, throttling the malicious network connection, blocking the container 110, quarantining the container 110, terminating execution of the container 110 on the network device 104, or generating an alert, or some combination thereof.

The method 200 may include, at action 228, allowing the network connection. For example, where the security application 108 determined, at action 222, that an actual network connection did not bypass the shim and/or that the corresponding notification properly included the unique identifier, the security actual network connection may allow, at action 228, the actual network connection as a legitimate network connection.

The method 200 may thus be employed, in some embodiments, to identify and mitigate harm from malicious network connections by the container 110. For example, in a supply chain attack where a malicious actor operating the malicious network device 120 gains access to the container 110 in a supply chain by inserting the malicious third-party library 118 into the container 110, and then attempts to create malicious network connections between the container 110 and another device (such as the malicious network device 120 or one of the webservers 106a-106n), the method 200 may be employed to identify and mitigate harm from any such malicious network connections. In so doing, the method 200 may prevent the malicious actor in the supply chain attack from stealing sensitive information from the container 110 or from granting access to the container 110 to an unauthorized device, and may thus prevent the malicious actor from inflicting substantial damage on the supply chain.

Although the actions of the method 200 are illustrated in FIGS. 2A-2B as discrete actions, various actions may be divided into additional actions, combined into fewer actions, reordered, expanded, or eliminated, depending on the desired implementation. For example, in some embodiments, the actions of the method 200 may be performed without performing the unique identifier aspects of the actions 202 and 222. Also, in some embodiments, the actions 204-224 may be employed without performing other actions of the method 200. Also, in some embodiments, any of the actions 202 or 226 may be performed by a network administrator or other entity that is different from the entity performing the other actions of the method 200.

Further, it is understood that the method 200 may improve the functioning of a computer system itself. For example, the functioning of the network device 104 of FIG. 1 may itself be improved by the method 200. For example, the network device 104 may be improved by the method 200 by identifying and mitigating harm from malicious network connections by the container 110 that is executing on the network device 104. The method 200 that employs a shim may be more effective than conventional methods of identifying malicious network connections due to malicious actors becoming increasingly adept at disguising malicious network connections from a container as legitimate network connections.

Also, the method 200 may improve the technical field of securing network devices. For example, employing a shim to identify and mitigate harm from malicious network connections by the container 110 may enable the method 200 to prevent a malicious actor in the supply chain attack from stealing sensitive information from the container 110 or from granting access to the container 110 to an unauthorized device, and may thus prevent the malicious actor from inflicting substantial damage on the network device 104 and its function in the supply chain.

FIG. 3 illustrates an example computer system 300 that may be employed in identifying and mitigating harm from malicious network connections by a container. In some embodiments, the computer system 300 may be part of any of the systems or devices described in this disclosure. For example, the computer system 300 may be part of the network device 104, the webservers 106a-106n, or the malicious network device 120 of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIGS. 2A-2B. These computer-executable instructions may be included, for example, in the operating system 310, in one or more applications, such as the module 314, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more actions of the method 200 of FIGS. 2A-2B. In some embodiments, the module 314 may be part of the operating system 310 or may be part of an application of the computer system 300, or may be some combination thereof. In some embodiments, the module 314 may function as the security application 108, the container 110, and/or the malware 122 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and mitigating harm from malicious network connections by a container, at least a portion of the method being performed by one or more computing devices comprising one or more processors, the method comprising:
   receiving, from a shim, notifications of all network connections that the container has sought to establish through the shim, wherein the notifications are received from a shim library due to a function from the shim library being called from within the container;
   monitoring all the network connections established by the container;
   comparing the notifications to the network connections established by the container to determine whether a network connection established by the container bypassed the shim by using an illegitimate API call to the shim library of the shim, wherein a notification of the network connection that bypassed the shim does not have an identifier associated with the container and the shim library; and
   in response to determining that the network connection established by the container bypassed the shim:
      identifying the network connection established by the container that bypassed the shim as a malicious network connection; and
      performing a security action to mitigate harm from the malicious network connection.

2. The method of claim 1, wherein the performing of the security action to mitigate harm from the malicious network connection comprises one or more of:
   blocking the malicious network connection, rerouting the malicious network connection, or throttling the malicious network connection.

3. The method of claim 1, wherein the performing of the security action to mitigate harm from the malicious network connection comprises one or more of:
   blocking the container, quarantining the container, or terminating execution of the container.

4. The method of claim 1, wherein the monitoring of all the network connections established by the container comprises monitoring net flow logs of all the network connections established by the container.

5. The method of claim 1, wherein the malicious network connection originated from a malicious third-party library that was injected into the container.

6. The method of claim 1, wherein each notification of each network connection includes an IP address of another device with which the container seeks to communicate over a corresponding network connection.

7. A computer-implemented method for identifying and mitigating harm from malicious network connections by a container, at least a portion of the method being performed by one or more computing devices comprising one or more processors, the method comprising:
   determining a unique identifier that is associated with the container;
   receiving, from a shim, notifications of all network connections that the container has sought to establish through the shim, each notification either including the unique identifier or not including the unique identifier;
   monitoring all the network connections established by the container;
   comparing the notifications to the network connections established by the container to determine whether a network connection established by the container bypassed the shim by using an illegitimate API call from within the container, wherein a notification of the network connection that bypassed the shim does not have the unique identifier associated with the container; and
   in response to determining that the network connection established by the container bypassed the shim:
      identifying the network connection established by the container that bypassed the shim as a malicious network connection, wherein the malicious network connection originated from a malicious third-party library that was injected into the container; and
      performing a security action to mitigate harm from the malicious network connection.

8. The method of claim 7, wherein the performing of the security action to mitigate harm from the malicious network connection comprises one or more of:
   blocking the malicious network connection, rerouting the malicious network connection.

9. The method of claim 7, wherein the performing of the security action to mitigate harm from the malicious network connection comprises one or more of:
   blocking the container, quarantining the container, or terminating execution of the container.

10. The method of claim 7, wherein:
    the shim comprises a shim library; and
    the receiving, from the shim library, of the notifications comprises receiving the notifications from the shim library due to a function from the shim library being called from within the container.

11. The method of claim 7, wherein the monitoring of all the network connections established by the container comprises monitoring net flow logs of all the network connections established by the container.

12. The method of claim 7, wherein each notification of each network connection includes an IP address of another device with which the container seeks to communicate over a corresponding network connection.

13. The method of claim 7, wherein the determining of the unique identifier that is associated with the container comprises receiving the unique identifier over a secure channel prior to the container establishing any network connections.

14. One or more non-transitory computer-readable media comprising one or more computer-readable instructions that, when executed by one or more processors of one or more computing devices, cause the one or more computing devices to perform a method for identifying and mitigating harm from malicious network connections by a container, the method comprising:

receiving, from a shim, notifications of all network connections that the container has sought to establish through the shim;

monitoring all the network connections established by the container;

comparing the notifications to the network connections to determine whether a network connection established by the container bypassed the shim by using an illegitimate API call to a shim library of the shim, wherein a notification of the network connection that bypassed the shim does not have an identifier associated with the container and the shim library; and in response to determining that the network connection established by the container bypassed the shim:

identifying the network connection established by the container that bypassed the shim as a malicious network connection, wherein the malicious network connection originated from a malicious third-party library that was injected into the container; and performing a security action to mitigate harm from the malicious network connection.

15. The one or more non-transitory computer-readable media of claim 14, wherein the performing of the security action to mitigate harm from the malicious network connection comprises one or more of:

blocking the malicious network connection, rerouting the malicious network connection, throttling the malicious network connection, blocking the container, quarantining the container, or terminating execution of the container.

16. The one or more non-transitory computer-readable media of claim 14, wherein:

the receiving, from the shim, the notifications of all the network connections comprises receiving the notifications from the shim library due to a function from the shim library being called from within the container.

17. The one or more non-transitory computer-readable media of claim 14, wherein the monitoring of all the network connections established by the container comprises monitoring net flow logs of all the network connections established by the container.

* * * * *